(12) United States Patent
Rios

(10) Patent No.: US 8,657,531 B2
(45) Date of Patent: Feb. 25, 2014

(54) INSTALLATION METHOD OF FLEXIBLE PIPE WITH SUBSEA CONNECTOR, UTILIZING A PULL DOWN SYSTEM

(75) Inventor: Carlos M. Rios, Fulshear, TX (US)

(73) Assignee: Technip France, Courbevoie (FR)

( * ) Notice: Subject to any disclaimer, the term of this patent is extended or adjusted under 35 U.S.C. 154(b) by 777 days.

(21) Appl. No.: 12/725,133

(22) Filed: Mar. 16, 2010

(65) Prior Publication Data

US 2011/0229270 A1    Sep. 22, 2011

(51) Int. Cl.
*F16L 1/00*    (2006.01)
(52) U.S. Cl.
USPC .......................... 405/169; 405/158; 405/184.4
(58) Field of Classification Search
USPC ............. 405/155, 158, 166, 168.1, 169, 171, 405/184.4; 166/338, 341, 345
See application file for complete search history.

(56) References Cited

U.S. PATENT DOCUMENTS

| | | | |
|---|---|---|---|
| 4,075,862 A | | 2/1978 | Ames |
| 4,793,737 A | * | 12/1988 | Shotbolt ....................... 405/169 |
| 4,906,137 A | * | 3/1990 | Maloberti et al. .......... 405/224.3 |
| 5,320,175 A | | 6/1994 | Ritter et al. |
| 6,869,253 B2 | * | 3/2005 | Biolley ....................... 405/224.3 |
| 7,798,232 B2 | * | 9/2010 | Headworth ................... 166/352 |
| 2008/0253842 A1 | * | 10/2008 | Wolbers et al. ............... 405/169 |
| 2010/0018717 A1 | * | 1/2010 | Espinasse et al. ............ 166/346 |

FOREIGN PATENT DOCUMENTS

| | | |
|---|---|---|
| FR | 2 911 907 | 8/2008 |
| FR | 2 927 651 | 8/2009 |
| FR | 2 929 638 | 10/2009 |
| WO | 2009/053022 | 4/2009 |

OTHER PUBLICATIONS

Vecchio, G., International Search Report for International Patent Application No. PCT/US2011/028309, dated Jul. 19, 2011, European Patent Office.
Vecchio, G., Written Opinion for International Patent Application No. PCT/US2011/028309, dated Jul. 19, 2011, European Patent Office.

* cited by examiner

*Primary Examiner* — Benjamin Fiorello
(74) *Attorney, Agent, or Firm* — Locke Lord LLP

(57) ABSTRACT

The disclosure provides an installation method to deploy the flexible pipe below the water, utilizing supporting equipment between a flexible pipe and intended connections. In addition, the method of connection and pull down can maintain control of the flexible pipe subsea throughout the method with limited or no surface intervention. This installation method provides a redundancy as the connector approaches in a subsea connection in at least one embodiment. The method utilizes combinations of buoyancy elements, hand-off sequences, and pull down equipment, such as subsea winches and wire rope, to accomplish such connections with limited or no surface intervention.

30 Claims, 9 Drawing Sheets

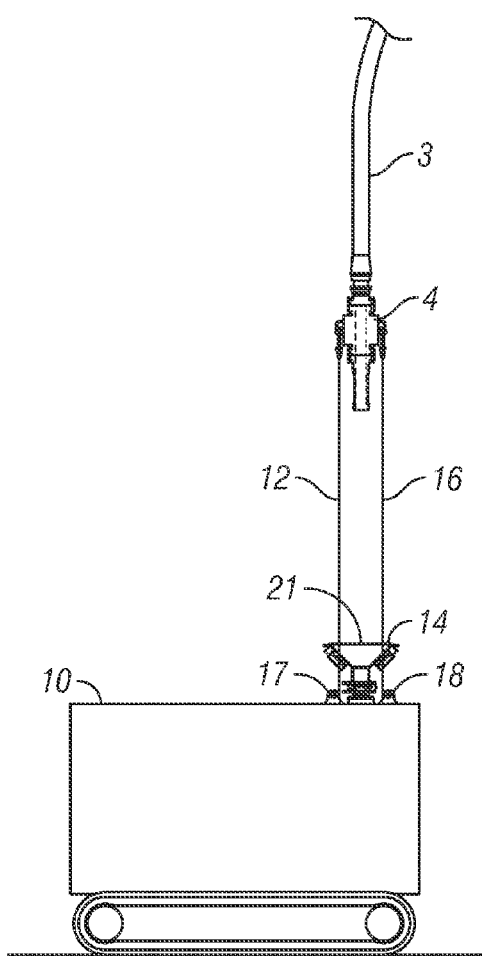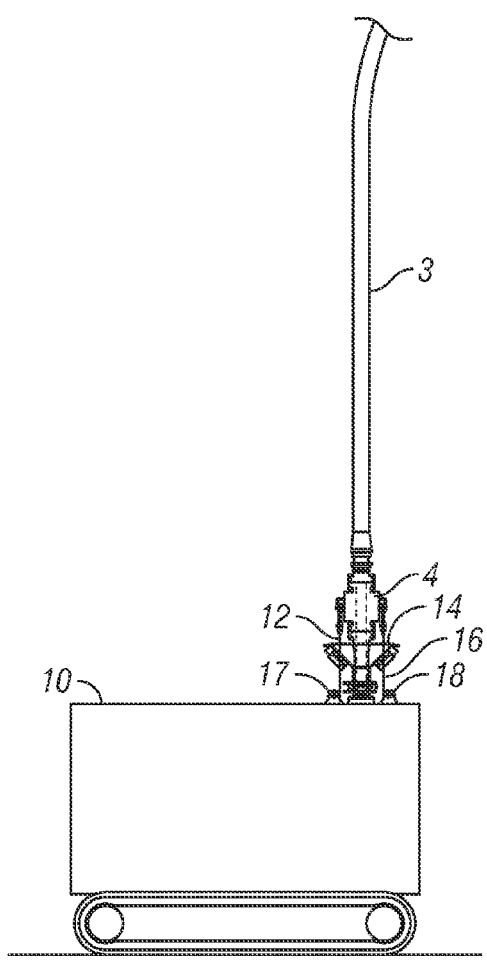

INSTALLATION METHOD OF FLEXIBLE PIPE WITH SUBSEA CONNECTOR, UTILIZING A PULL DOWN SYSTEM

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

1. Field of the Invention

The disclosure taught herein relates generally to subsea operations on installing pipe to subsea equipment, and more specifically, relates to an installation method of installing flexible pipe with a subsea connector, utilizing a pull down system.

2. Description of the Related Art

Currently for subsea mining extraction, a vertical riser is deployed from a sea surface by a floating structure, such as a vessel. The top of this riser is maintained to a deck of the vessel and is deployed under the vessel by a moonpool or from the side of the vessel. A subsea pump is connected to the bottom of the vertical riser. A flexible pipe (or jumper) is connected between the subsea pump and a subsea miner. The miner can move on the seafloor in order to mine solids on the seafloor and thus beneficially use the flexibility of the flexible pipe. Usually, the bottom of the riser is connected to the subsea pump and a first portion of the jumper is connected to the pump. Then, the riser with the associated equipment is deployed vertically under the vessel with the pump and the jumper in the vertical position.

It would be advantageous to lower the subsea miner with a crane from the vessel to the seafloor and to position a second portion of the jumper vertically above the subsea miner to connect the jumper to the subsea miner and continue to deploy the riser. Also, it would be advantageous to connect the second portion of the jumper to the subsea miner under the vessel and deploy both of the first and second portions of the jumper subsea. However, without more, this desirable solution would introduce a high level of risk to damaging the jumper connections in trying to control or connect the pump and jumper with the subsea miner on the seafloor from top surface operations. This desirable solution would impose more risk, man hours, vessel down time, and inherently more associated costs.

Subsea equipment other than subsea miners have similar issues. For example, pipeline end terminals (PLET) that are designed to transfer liquids and other materials to further equipment require connections that fluidicly couple the PLET to pipes and other conduits. The expense of such making such subsea connections, and risk of damaging such connections presents challenges under present methods.

There remains a need for connecting pipe with subsea connections that utilizes little or no intervention from a top surface.

BRIEF SUMMARY OF THE INVENTION

The disclosure provides an installation method to safely and routinely deploy the flexible pipe below the water, utilizing supporting equipment without damage between a flexible pipe and intended connections. In addition, the method of connection and pull down can maintain control of the flexible pipe subsea throughout the method with limited or no surface intervention. This installation method reduces risk of damage to the flexible pipe and the connection elements during the installation and provides a safety redundancy as the connector approaches in a subsea connection in at least one embodiment. The method utilizes combinations of buoyancy elements, hand-off sequences, and pull down equipment, such as subsea winches and wire rope, to accomplish such connections with limited or no surface intervention.

A method of installing a flexible pipe with a subsea connector into a connector on a subsea transfer equipment, comprising: providing a first connector fluidicly coupled to a flexible pipe, the flexible pipe having a buoyancy module coupled thereto to provide buoyancy for the first connector in water; coupling a first wire rope to the first connector, the first wire rope having a first buoyancy module coupled thereto; coupling a weight to the first wire rope distal from the first connector; lowering the first connector toward a seafloor and disposing the first connector vertically in proximity to the subsea transfer equipment, while allowing the weight to engage a supporting surface; coupling a winch wire rope from a first winch on the subsea transfer equipment to the first connector; decoupling the first wire rope from the first connector; pulling the first connector toward the subsea transfer equipment with the winch wire rope from the first winch; and fluidicly coupling the first connector to a connector on the subsea transfer equipment.

A method of installing a flexible pipe with a subsea connector into a connector on a subsea transfer equipment, comprising: fluidicly coupling a riser to a pump; fluidicly coupling the pump to a flexible pipe, the flexible pipe being fluidicly coupled with a first connector distal from the pump and coupled with a buoyancy module to provide buoyancy to the first connector; coupling a first wire rope to the first connector; coupling a first buoyancy module to the first wire rope; coupling a weight to the first wire rope distal from the first connector; lowering the first connector toward a seafloor; lowering a subsea miner to the seafloor in proximity to the first connector; coupling a wire rope from a first winch on the subsea miner to the first connector; decoupling the first wire rope from the first connector; pulling the first connector toward the subsea miner with the wire rope from the first winch; and fluidicly coupling the first connector to a connector on the subsea miner.

A method of installing a flexible pipe with a subsea connector into a connector on a subsea transfer equipment, comprising: fluidicly coupling a riser to a pump; fluidicly coupling the pump to a flexible pipe, the flexible pipe being fluidicly coupled with a first connector distal from the pump and coupled with a buoyancy module to provide buoyancy to the first connector; coupling a first wire rope to an intermediate member; coupling a first intermediate wire rope to the intermediate member; coupling a second intermediate wire rope to the intermediate member; coupling the first and second intermediate wire ropes to the first connector distal from the intermediate member; coupling a first buoyancy module to the first wire rope at a position below the intermediate member; coupling a weight to the first wire rope distal from the first connector; lowering the first connector toward a seafloor; lowering a subsea miner to the seafloor in proximity to the first connector; coupling a wire rope from a first winch on the subsea miner to the first connector; decoupling the first intermediate wire rope from the first connector; coupling a second buoyancy module to the intermediate member; decoupling the second intermediate wire rope from the first connector; pulling the first connector toward the subsea miner with the wire rope from the first winch; and fluidicly coupling the first connector to a connector on the subsea miner.

BRIEF DESCRIPTION OF THE SEVERAL VIEWS OF THE DRAWINGS

FIG. 7 is a side view schematic diagram illustrating an exemplary sequence step of the installation method after FIG. 6.

FIG. 8 is a side view schematic diagram illustrating an exemplary sequence step of the installation method after FIG. 7.

DETAILED DESCRIPTION OF THE INVENTION

The Figures described above and the written description of specific structures and functions below are not presented to limit the scope of what Applicant has invented or the scope of the appended claims. Rather, the Figures and written description are provided to teach any person skilled in the art how to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location, and from time to time. While a developer's efforts might be complex and time-consuming in an absolute sense, such efforts would be, nevertheless, a routine undertaking for those of ordinary skill in this art having benefit of this disclosure. It must be understood that the inventions disclosed and taught herein are susceptible to numerous and various modifications and alternative forms. The use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the is invention or the appended claims.

The disclosure provides an installation method to safely and routinely deploy the flexible pipe below the water, utilizing supporting equipment without damage between a flexible pipe and intended connections. In addition, the method of connection and pull down can maintain control of the flexible pipe subsea throughout the method with limited or no surface intervention. This installation method reduces risk of damage to the flexible pipe and the connection elements during the installation and provides a safety redundancy as the connector approaches in a subsea connection in at least one embodiment. The method utilizes combinations of buoyancy elements, hand-off sequences, and pull down equipment, such as subsea winches and wire rope, to accomplish such connections with limited or no surface intervention.

Figure 1:
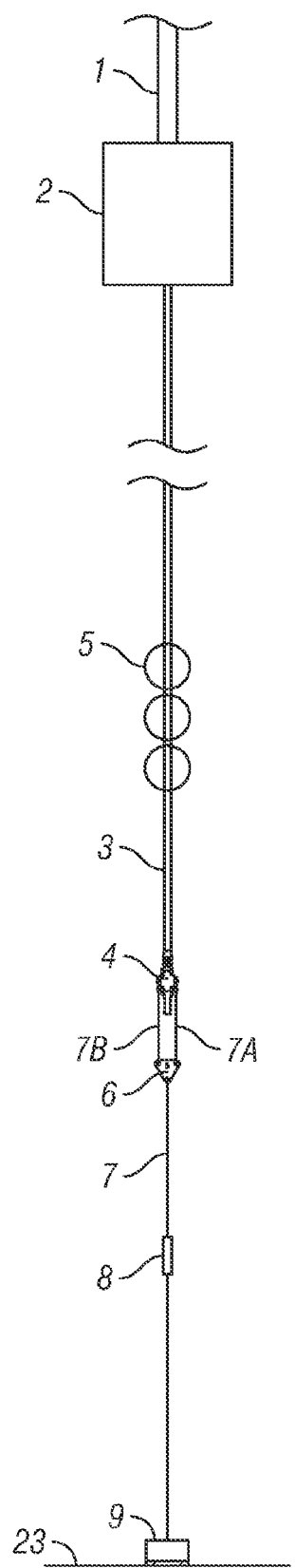
FIG. 1 is a side view schematic diagram illustrating a flexible pipe with running equipment attached and in the vertical position.

FIG. 1 is a side view schematic diagram illustrating a flexible pipe with running equipment attached and in the vertical position. A rigid vertical riser 1 is deployed from a floating structure, such as a vessel (not shown). A subsea pump 2 is coupled at a bottom end of the rigid vertical riser 1. A first end of a flexible pipe or jumper 3 is coupled to the subsea pump 2. The jumper 3 functions as a riser transfer pipe between a subsea transfer component 10, described below, and the vertical riser 1. The subsea transfer component 10 is used to transfer material obtained from a source, such as a seafloor, pipeline, or well, and provide the material through the flexible pipe to another component, such as a pump, or even other transfer component. For purposes of illustration of at least one embodiment, FIGS. 1-10 will describe the methods of the disclosure applied to an exemplary subsea conductor 10, such as a subsea miner. Therefore, for ease of reference and understanding as to FIGS. 1-10, the subsea transfer equipment will be referenced therein as a subsea miner 10, although it is to be understood that the subsea transfer equipment is not limited to subsea miners.

The jumper is generally buoyantly biased. In at least one embodiment, the jumper can be made at least partially from buoyant material along one or more portions of the jumper. In other embodiments, the buoyancy can be obtained by one or more buoyancy modules 5 coupled to the jumper 3 in lieu of or in addition to the jumper being at least partially made from buoyant material. For illustration and without limitation, the buoyant modules 5 are shown in the Figures and the buoyancy attribute is described as buoyancy modules to represent that the flexible pipe is buoyantly biased, with the understanding that the buoyancy can be provided by buoyant material of the jumper in like fashion and such embodiments are encompassed herein, whether in fact the buoyant modules are used as separate components to the jumper or the jumper is made at least partially from buoyant material. In at least one embodiment, the buoyancy module 5 is placed at an intermediate location of the jumper 3, so that a portion of the jumper above the buoyancy module can be slack and curve in the water. A second end of the jumper 3 is equipped with a connector 4 that is adapted to be coupled to a subsea miner 10 at the completion of the installation method. A wire rope 7 can be coupled to the connector 4. A first end of the wire rope 7 is coupled to the connector 4 by two intermediate wire ropes 7A, 7B, where the wire rope 7 is coupled to the two intermediate wire ropes 7A, 7B by an intermediate member 6, such as a tri-plate. This intermediate member 6 has a plurality of connection locations for the wire rope 7 on one end and the wire ropes 7A, 7B on the other end and for another buoyancy module 15 described below. The intermediate member 6 can establish an intervention point for a remote operated vehicle (ROV) for hand-off from the wire rope 7 to the subsea miner 10. A primary buoyancy module 8 is placed at a predetermined elevation to support the wire rope 7. In at least one embodiment, the buoyancy module 8 is placed at an intermediate location of the wire rope 7, so that a portion of the wire rope above the buoyancy module can be slack and curve in the water. A clump weight 9 can be coupled at a bottom end of the wire rope 7 to hold the wire rope in position on a supporting surface, such as a seafloor 23 or equipment above the seafloor, after deployment. The rigid vertical riser 1, subsea pump 2, jumper 3, wire rope 7, primary buoyancy module 8, and clump weight 9 can be deployed from the vessel together in a vertical position. The clump weight 9 is sized, so that the flexible pipe 3 can maintain a vertical straight-line configuration while passing through the water column toward the seafloor, eliminating fatigue-induced motions on the jumper 3.

Figure 2:
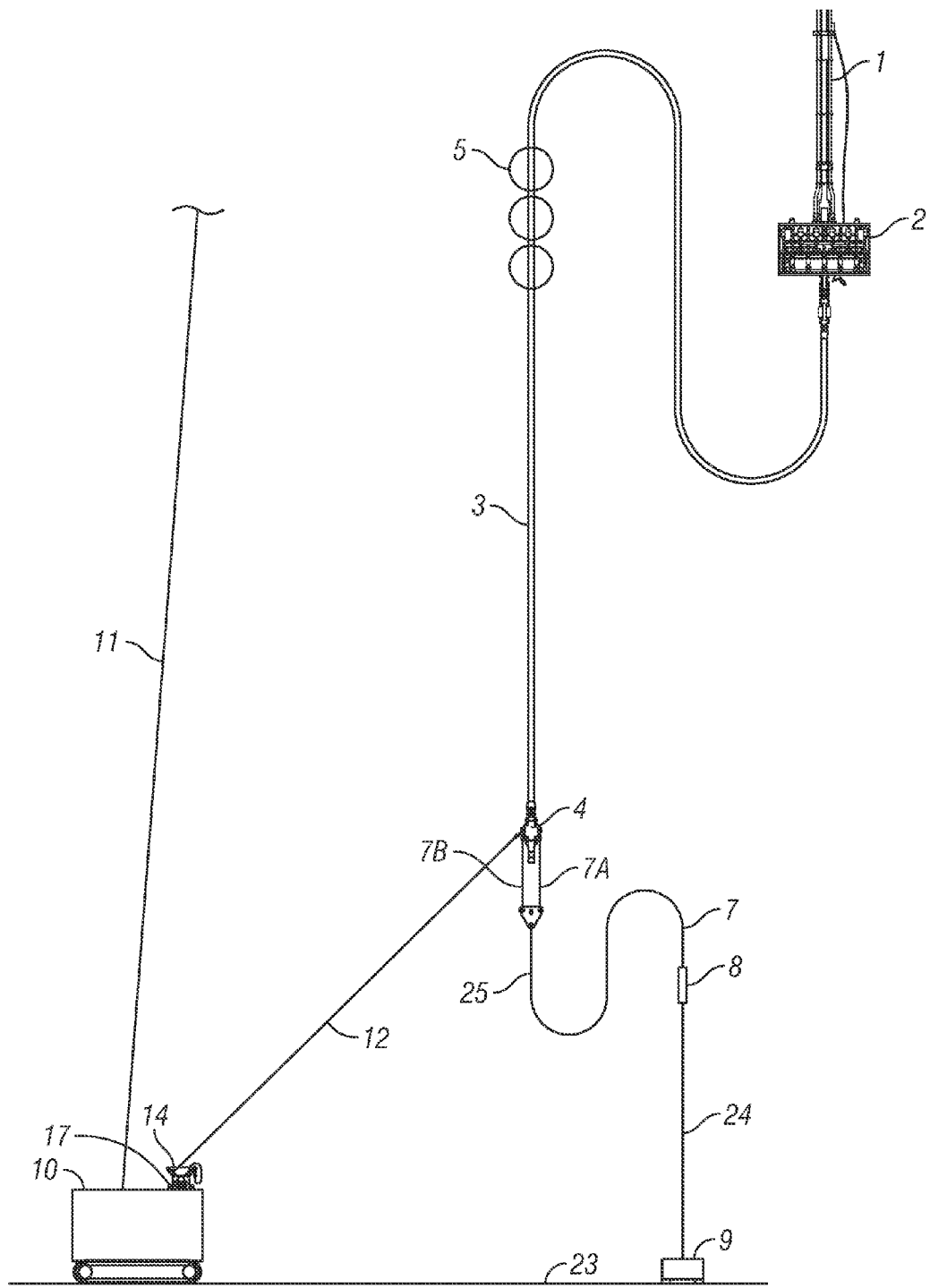
FIG. 2 is a side view schematic diagram illustrating the flexible pipe in a natural "S" curved shape after lowering the vertical riser and a subsea miner with associated equipment as an exemplary embodiment using the methods described herein.

FIG. 2 is a side view schematic diagram illustrating the flexible pipe in a natural "S" curved shape after lowering the vertical riser and a subsea miner with associated equipment as an exemplary embodiment using the methods described herein. When the rigid vertical riser 1 with the subsea pump 2 is completely deployed, the clump weight 9 is landed on the seafloor 23. A first portion 24 of the wire rope 7 is maintained vertically by the primary buoyancy module 8. A second portion 25 of the wire rope 7 above the buoyancy module 8 has a natural "S" curved shape. Similarly, a portion of the jumper 3 above the buoyancy module 5 has a natural "S" curved shape. The buoyancy module 5 assists in maintaining the portion of the jumper 3 below the buoyancy module and the connector 4 in a vertical direction with the slack in the wire rope 7 above the buoyancy module 8. A subsea miner 10 is lowered by a cable 11 from the vessel to the seafloor 23. As described in more detail in FIG. 5 below, the subsea miner 10 has a connector assembly 14 with, among other elements, a first subsea winch 17 having a first wire rope 12 coupled thereto. The first wire rope 12 is pulled out from the first subsea winch 17 by an ROV. This first wire rope 12 is coupled to the connector 4 on the flexible jumper 3.

Figure 3:
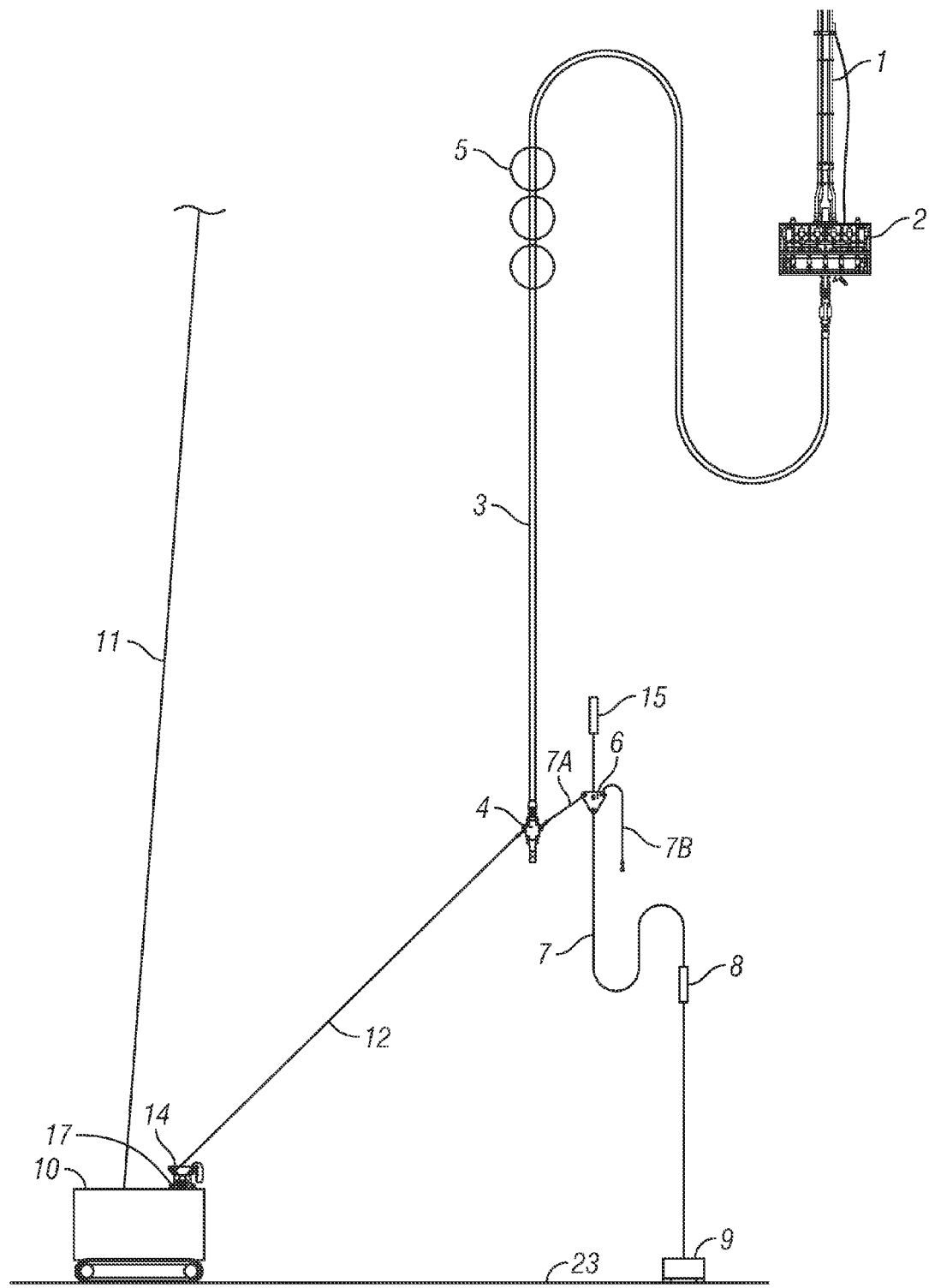
FIG. 3 is a side view schematic diagram illustrating an exemplary sequence step of the installation method.
Figure 5:
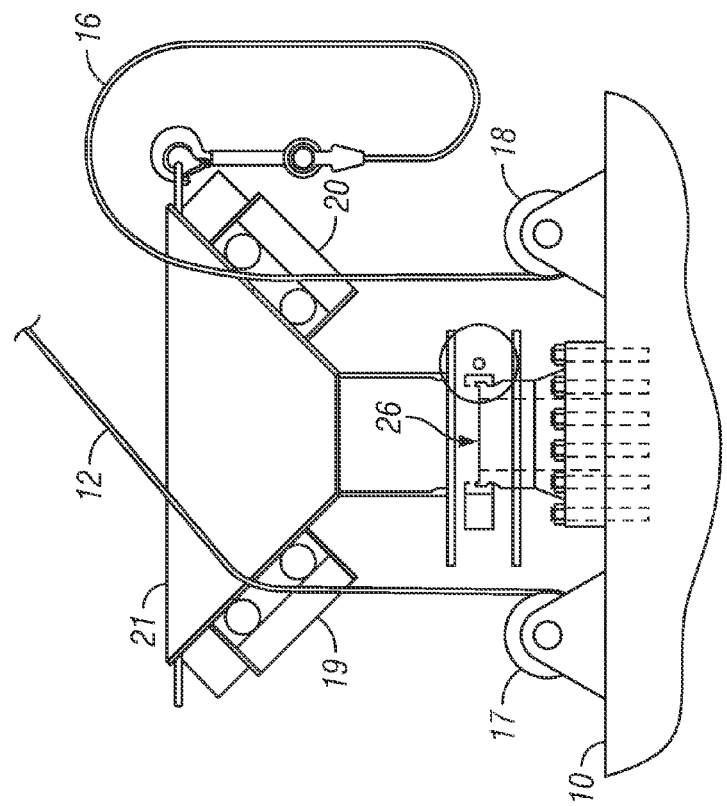
FIG. 5 is a detail side view schematic diagram illustrating a guidance system on the subsea miner and the subsea winches.
Figure 4:
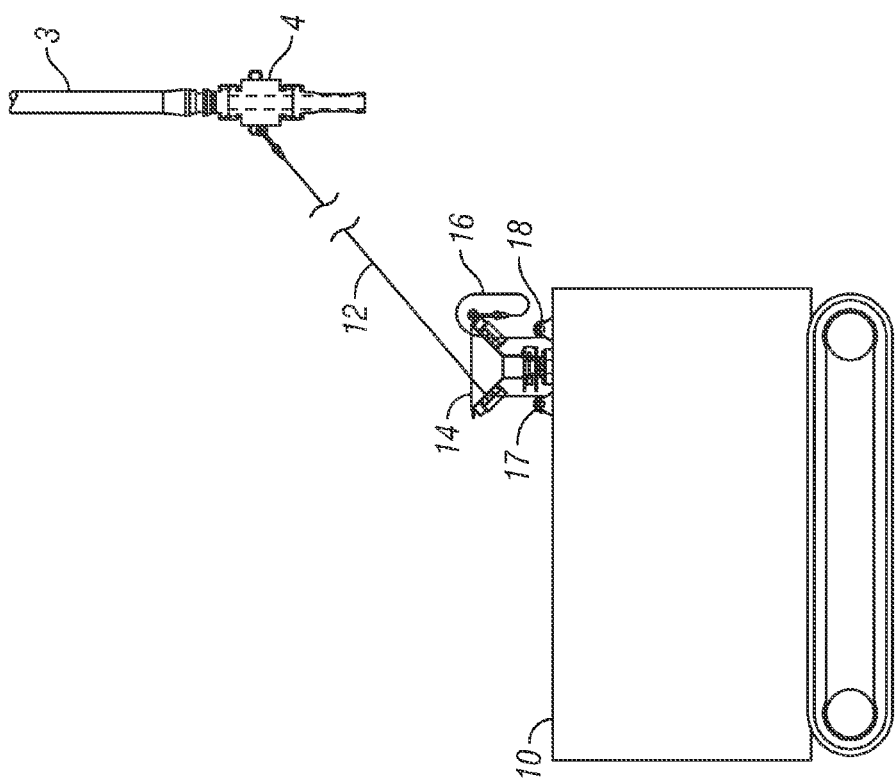
FIG. 4 is a detail side view schematic diagram illustrating a connector assembly on a subsea miner with associated equipment as an exemplary.

FIG. 3 is a side view schematic diagram illustrating an exemplary sequence step of the installation method. FIG. 4 is a detail side view schematic diagram illustrating a connector assembly on a subsea miner with associated equipment. FIG. 5 is a detail side view schematic diagram illustrating a guidance system on the subsea miner and the subsea winches. The figures will be described in conjunction with each other. A connector assembly 14 includes a guide funnel 21 to guide the connector 4 on the jumper 3 into the connector assembly and allows initial misalignment, prior to a final approach of the connector 4 into a connector 26 at completion of the installation method. The vertically disposed guide funnel 21 can assist in aligning the connector 4 with the jumper 3 to a vertical position prior to entry. The connector assembly 14 further includes one or more subsea winches 17, 18 in proximity to the connector 26, and one or more multi-angle fairleads 19, 20 aligned with the subsea winches to cooperatively guide wire ropes on the winches. The multi-angle fairleads 19, 20 can maintain wire rope alignment at any deployment angle. Further, the connector assembly 14 can include a wire rope 12 coupled to the winch 17, and a wire rope 16 coupled to the winch 18, both wire ropes 12, 16 being adapted to be coupled to the connector 4, as described below. While one winch can be used to pull in the connector 4, it is envisioned that providing two or more winches can add redundancy to the system in case of failure of one of the wire ropes or winches. Further, two or more winches with two or more wire ropes coupled to the connector 4 can provide better control for guiding the connector 4 into the connector assembly 14 and the connector 26, as described below.

The ROV also couples a secondary buoyancy module 15 to the intermediate member (tri-plate) 6. The ROV removes the first intermediate wire rope 7B from the connector 4. The sequence order, as in other instances herein, can be varied. For example, the ROV can remove first intermediate wire rope 7B from the connector 4 and couple the secondary buoyancy module 15 to the intermediate member (tri-plate) 6. The secondary buoyancy module 15 helps maintain the wire rope 7 in a suspended condition, and the second intermediate wire rope 7A maintains the connection between the jumper 3 and the wire rope 7. The first subsea winch 17, coupled to the connector assembly 14, pulls in the first wire rope 12.

Figure 6:
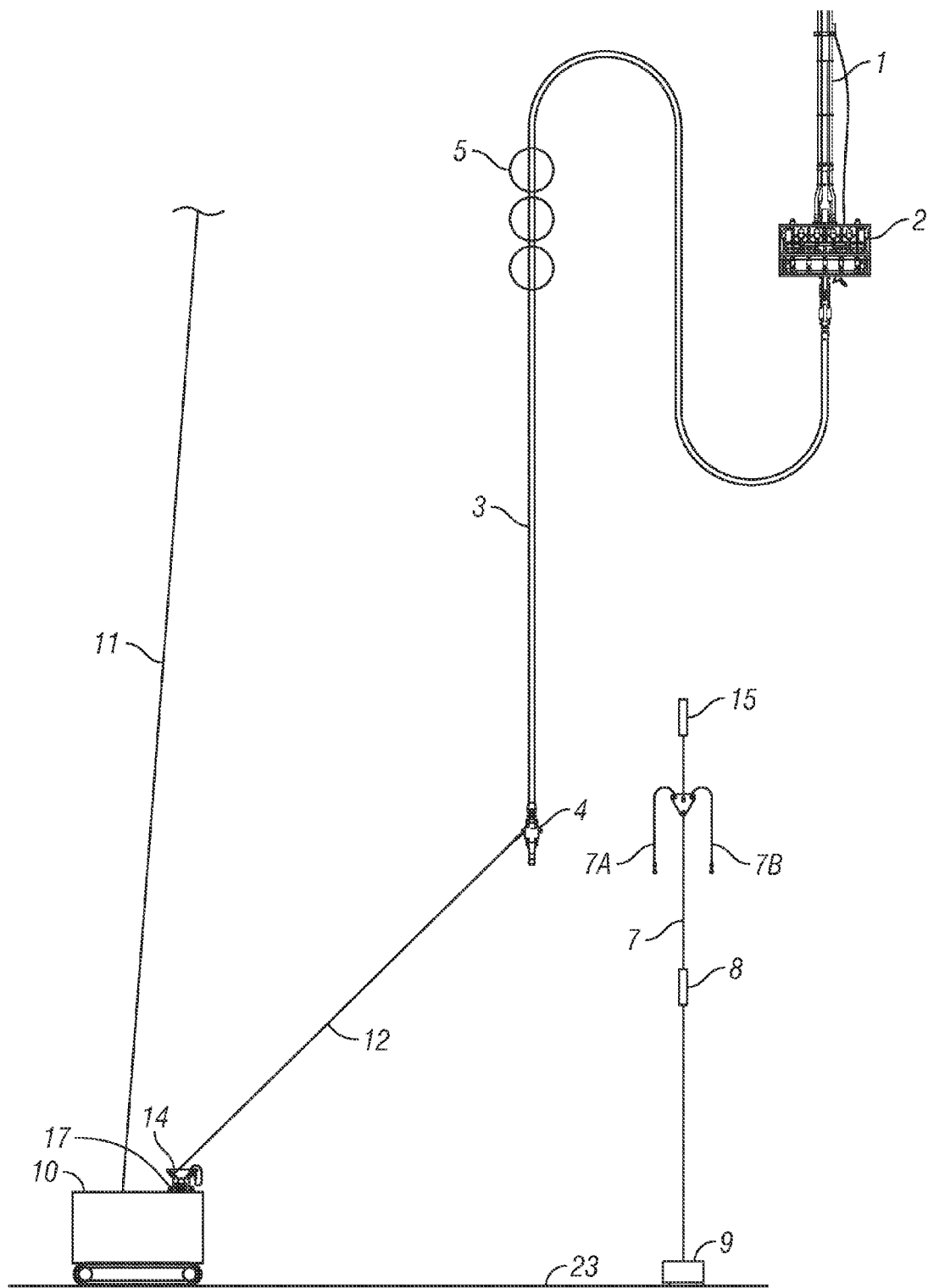
FIG. 6 is a side view schematic diagram illustrating an exemplary sequence step of the installation method after FIGS. 3 and 4.

FIG. 6 is a side view schematic diagram illustrating an exemplary sequence step of the installation method after FIGS. 3 and 4. The ROV can decouple the second intermediate wire rope 7A from the connector 4 with the jumper 3. The jumper 3 can be maintained in its position by the first subsea winch 17 and the first wire rope 12 in cooperation with the buoyancy module 15.

FIG. 7 is a side view schematic diagram illustrating an exemplary sequence step of the installation method after FIG. 6. The ROV takes the wire rope 16 from the subsea winch 18 (shown in FIG. 5) and couples the wire rope 16 to the connector 4 with the jumper 3. The connector 4 is thus secured with the wire rope 12 and the wire rope 16 to the subsea miner 10, but not yet connected to the connector 26. Advantageously, the wire rope 16 can be oriented on an opposite face of the connector 4 from the wire rope 12 to assist in aligning the connector 4 into the connector 26.

FIG. 8 is a side view schematic diagram illustrating an exemplary sequence step of the installation method after FIG. 7. The subsea winch 17 pulls in the second wire rope 12, and the subsea winch 15 pulls in the second wire rope 16. The subsea winches 17 and 18 are used to control the pull-down necessary for landing the connector 4 and coupling with the connector 26 of the connector assembly 14 on the subsea miner 10. These winches can also be used to maintain control of the jumper 3 when necessary for disengagement.

Figure 9:
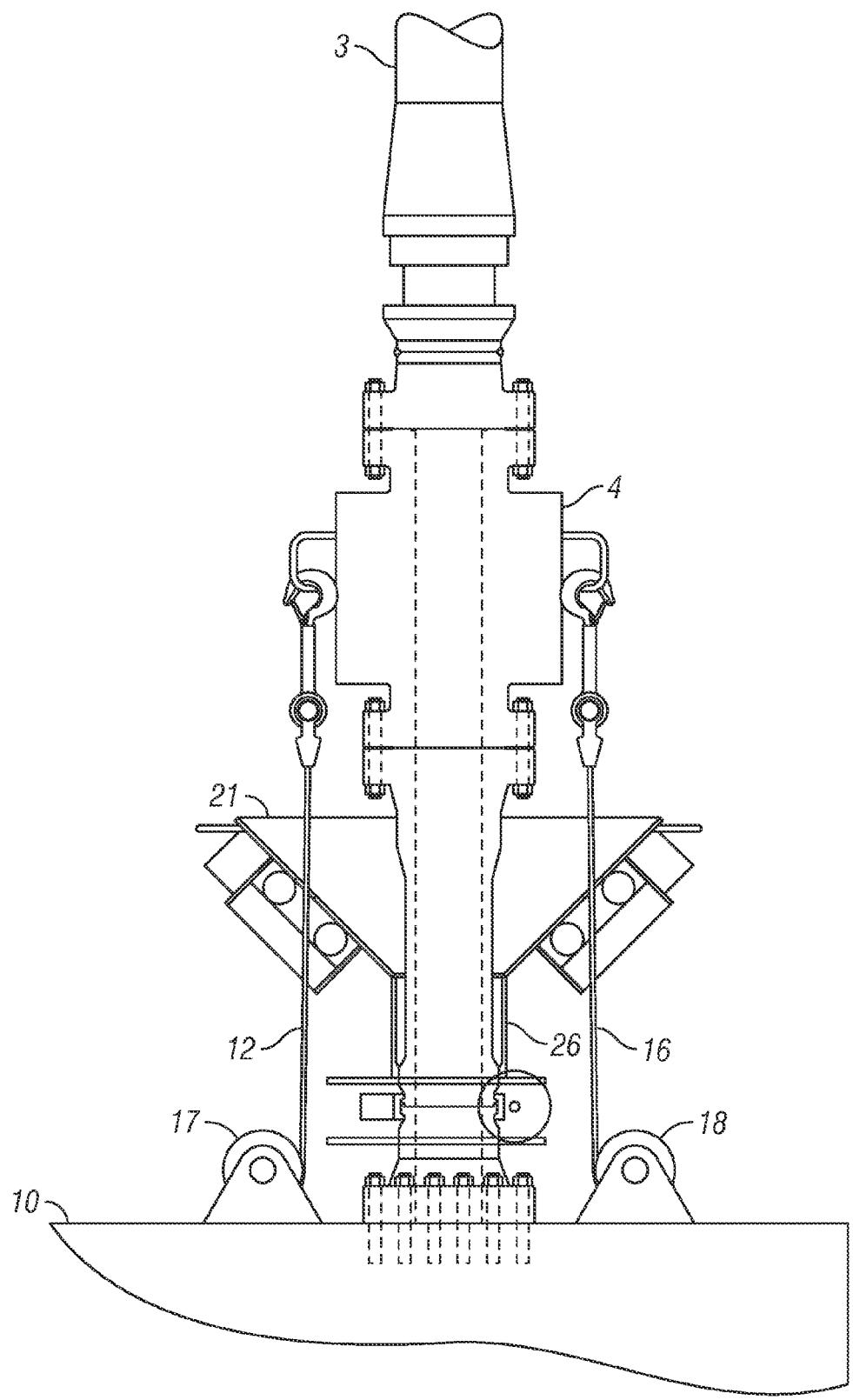
FIG. 9 is a detail side view schematic diagram illustrating the guidance system on the subsea miner regarding FIG. 8.

FIG. 9 is a detail side view schematic diagram illustrating the guidance system on the subsea miner regarding FIG. 8. When the connector 4 is completely engaged in the connector 14, the connector 4 can be locked by a single bolt connector 22 to the connector 14.

Figure 10:
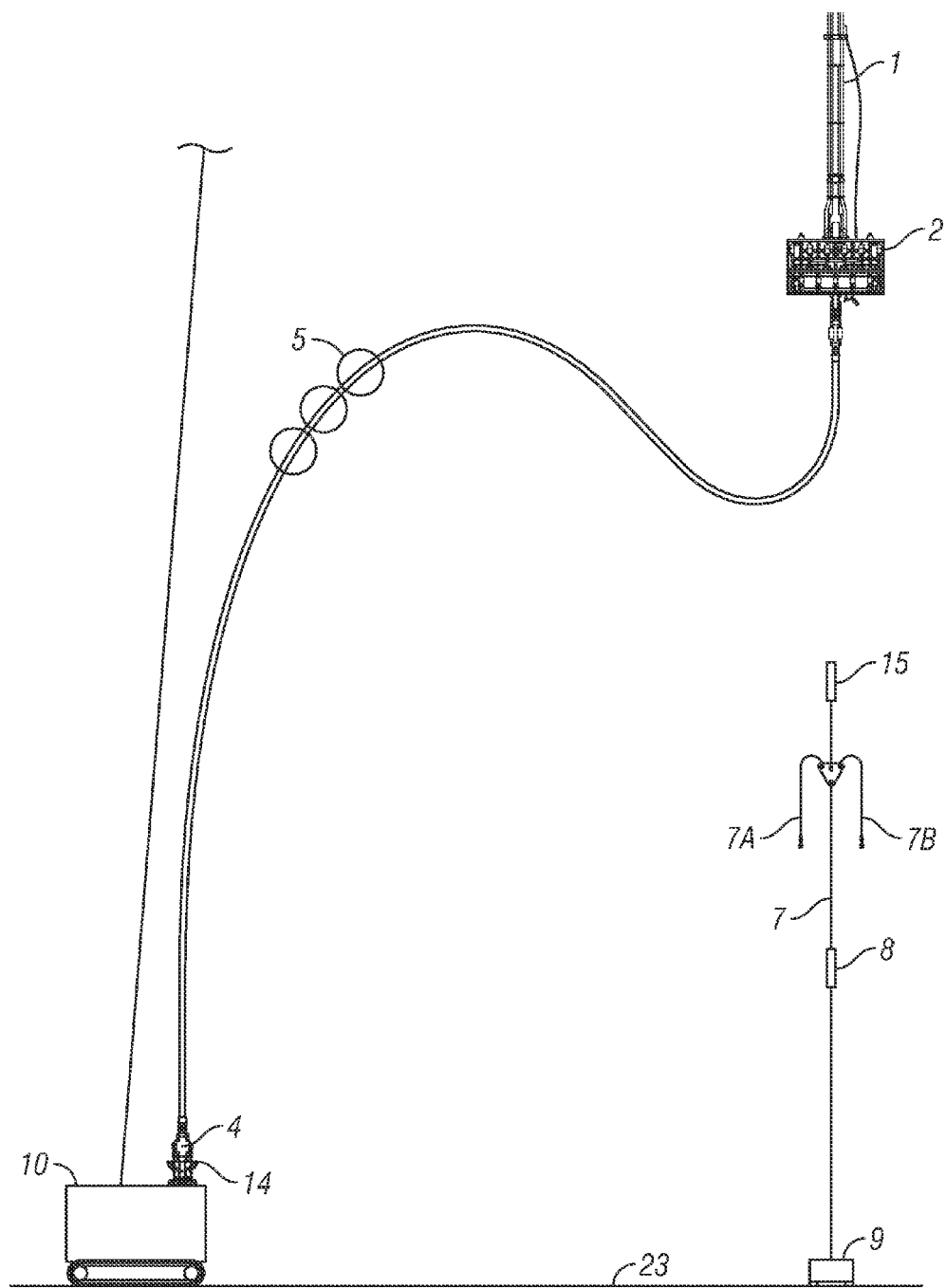
FIG. 10 is a side view schematic diagram illustrating an exemplary sequence step of the installation method after FIG. 8.

FIG. 10 is a side view schematic diagram illustrating an exemplary sequence step of the installation method after FIG. 8. The jumper 3 is coupled between the pump 2 on one end and the subsea miner 10 on the other end. The subsea miner can move along the seafloor and mine in the area with the jumper coupled thereto. The connections between the components have been completed with little to no intervention from the surface.

Figure 11:
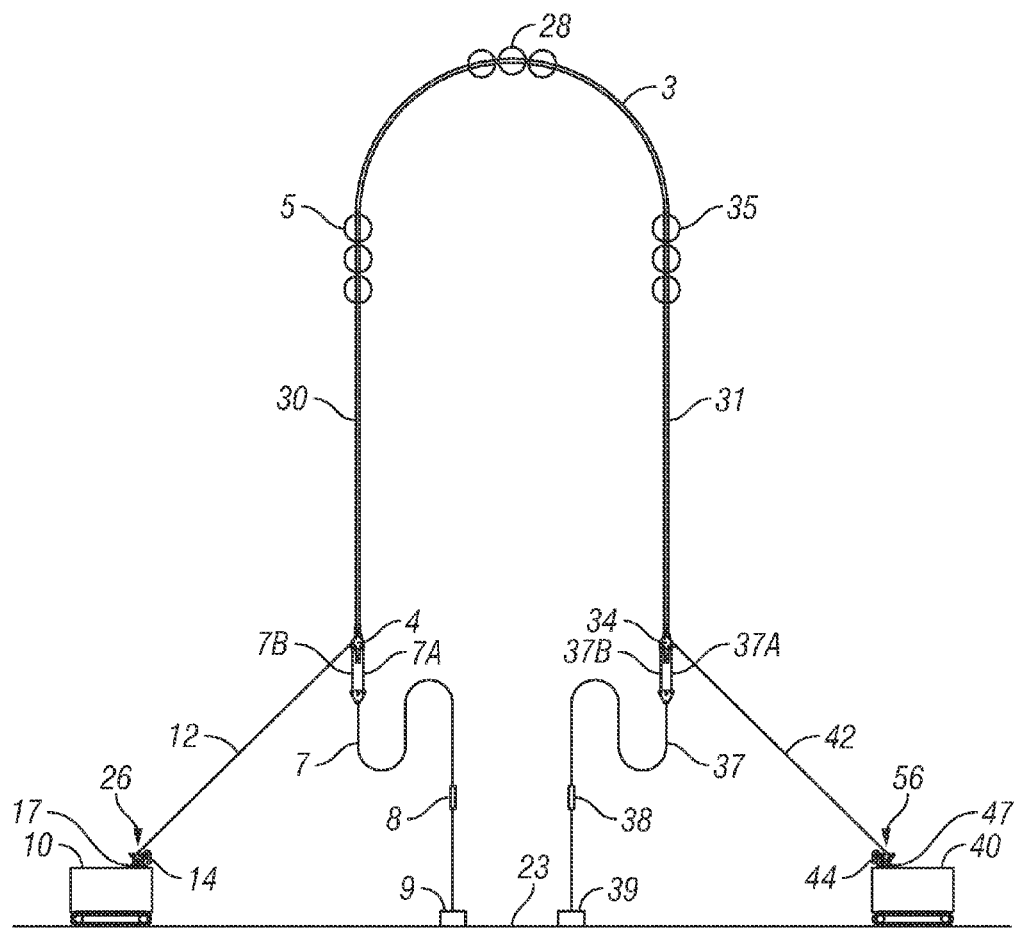
FIG. 11 is a side view schematic diagram illustrating another embodiment of a system using the methods described herein.

FIG. 11 is a side view schematic diagram illustrating another embodiment of a system using the methods described herein. Such methods can be applied to a pipeline end terminal ("PLET"), as another exemplary subsea transfer equipment. Still further, FIG. 11 and accompanying description show how the other end of the jumper distal from the connector 4 can be coupled to a second PLET in like manner as has been described above for connecting the connector 4 to the subsea miner 10.

In general, a first portion 30 of the flexible pipe or jumper 3 with the buoyancy module 5 can be lowered from above a water surface or from within the water (i.e., when not coupled to a riser). The jumper 3 can be coupled with the connector 4, and intermediate wire ropes 7A, 7B coupled between the connector 4 and the wire rope 7 with an intermediate member, such as a tri-plate described above. Further, the buoyancy module 8 is coupled to the wire rope 7, and the wire rope 7 is coupled to the weight 9. The weight 9 serves as an anchor on the seafloor 23. The buoyancy module 5 assists in maintaining the portion 30 of the jumper 3 below the buoyancy module and the connector 4 in a vertical direction with the slack in the wire rope 7 above the buoyancy module 8. A hand-off method from the wire rope 7 to the wire rope 12 can be performed as described above in FIGS. 1-10. The wire rope 12 from the subsea winch 17 on the connector assembly 14 can be coupled to the connector 4. The connector 4, buoyed by the buoyant module 5 on the jumper 3, can be pulled down by the winch 17 using the wire rope 12 to engage and be coupled with the connector assembly 14 and the vertically aligned connector 26 therein. A second winch (not labeled) and wire rope can also be used, as described in FIGS. 1-10 regarding the winch 18 and the wire rope 16.

Further, in some embodiments, a second end of the jumper may also be coupled to another subsea transfer component. One or more buoyant modules 28 can be located on the jumper 3 to provide buoyancy to a middle portion disposed between two ends of the jumper. In such embodiments, a similar method can be used to couple the second end of the jumper to another PLET, as described above to connect the connector 4 to the PLET 10.

In general, a second portion 31 of the flexible pipe or jumper 3 with the buoyancy module 35 can be lowered from above a water surface or from within the water. The jumper 3 can be coupled with the connector 34, and intermediate wire ropes 37A, 37B coupled between the connector 34 and the wire rope 37. Further, the buoyancy module 38 is coupled to the wire rope 37, and the wire rope 37 is coupled to the weight 39. The weight 39 serves as an anchor on the seafloor 23. The buoyancy module 35 assists in maintaining the portion 31 of the jumper 3 below the buoyancy module and the connector 34 in a vertical direction with the slack in the wire rope 37 above the buoyancy module 38. A hand-off method from the wire rope 37 to the wire rope 42 can be performed as described above in FIGS. 1-10. The wire rope 42 from the subsea winch 47 on the connector assembly 44 can be coupled to the connector 34. The connector 34, buoyed by the buoyant module 35 on the jumper 3, can be pulled down by the winch 47 using the wire rope 42 to engage and be coupled with the connector assembly 44 and the vertically aligned connector 56 therein. A second winch (not labeled) and wire rope can also be used, as described in FIGS. 1-10 regarding the winch 18 and the wire rope 16.

Other and further embodiments utilizing one or more aspects of the inventions described above can be devised without departing from the spirit of Applicant's invention. For example, it is also possible to change an order of one or more sequences to accomplish the same or similar goals. Further, one or more subsea winches can be disposed at other locations and the wire rope routed toward the connector 26 to facilitate guiding the connector 4 thereto. Other variations are possible.

Further, the various methods and embodiments described herein can be included in combination with each other to produce variations of the disclosed methods and embodiments. Discussion of singular elements can include plural elements and vice-versa. References to at least one item followed by a reference to the item may include one or more items. Also, various aspects of the embodiments could be used in conjunction with each other to accomplish the understood goals of the disclosure. Unless the context requires otherwise, the word "comprise" or variations such as "comprises" or "comprising," should be understood to imply the inclusion of at least the stated element or step or group of elements or steps or equivalents thereof, and not the exclusion of a greater numerical quantity or any other element or step or group of elements or steps or equivalents thereof. The device or system may be used in a number of directions and orientations. The term "coupled," "coupling," "coupler," and like terms are used broadly herein and may include any method or device for securing, binding, bonding, fastening, attaching, joining, inserting therein, forming thereon or therein, communicating, or otherwise associating, for example, mechanically, magnetically, electrically, chemically, operably, directly or indirectly with intermediate elements, one or more pieces of members together and may further include without limitation integrally forming one functional member with another in a unitary fashion. The coupling may occur in any direction, including rotationally.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the invention has been described. Apparent modifications and alterations to the described embodiments are available to those of ordinary skill in the art given the disclosure contained herein. The disclosed and undisclosed embodiments are not intended to limit or restrict the scope or applicability of the invention conceived of by the Applicant, but rather, in conformity with the patent laws, Applicant intends to protect fully all such modifications and improvements that come within the scope or range of equivalent of the following claims.

What is claimed is:

1. A method of installing a flexible pipe with a subsea connector into a connector on a subsea transfer equipment, comprising:

providing a vertically oriented riser from a floating structure, the riser being coupled to a first end of the flexible pipe;

providing a first connector fluidicly coupled to a second end of the flexible pipe, the flexible pipe being at least partially buoyant to provide buoyancy for the first connector in water;

coupling a first wire rope to the first connector, the first wire rope having a first buoyancy module coupled thereto;

coupling a weight to the first wire rope distal from the first connector;

lowering the first connector toward a seafloor and disposing the first connector vertically in proximity to the subsea transfer equipment, while allowing the weight to engage a supporting surface and the flexible pipe to bend while the riser maintains its vertical orientation;

coupling a winch wire rope from a first winch on the subsea transfer equipment to the first connector;

decoupling the first wire rope from the first connector prior to coupling the first connector to the connector on the subsea transfer equipment;

pulling the first connector toward the subsea transfer equipment with the winch wire rope from the first winch; and
fluidicly coupling the first connector to the connector on the subsea transfer equipment.

2. The method of claim 1, wherein the subsea transfer equipment comprises a subsea miner.

3. The method of claim 1, wherein the subsea transfer equipment comprises a pipeline end terminal.

4. The method of claim 3, wherein a second connector is coupled to the first end of the flexible pipe and a buoyancy module is operatively coupled to the flexible pipe so that it provides buoyancy for the second connector in the water and comprising:
decoupling the first end of the flexible pipe from the riser;
coupling a second wire rope to the second connector, the second wire rope having a second buoyancy module coupled thereto;
coupling a second weight to the second wire rope distal from the second connector;
lowering the second connector toward the seafloor and disposing the second connector vertically in proximity to a second subsea transfer equipment, while allowing the weight to engage the seafloor;
coupling a second winch wire rope from a second winch on the second subsea transfer equipment to the second connector;
decoupling the second wire rope from the second connector;
pulling the second connector toward the second subsea transfer equipment with the winch wire rope from the second winch; and
fluidicly coupling the second connector to a connector on the second subsea transfer equipment.

5. The method of claim 1, wherein coupling the first wire rope to the first connector comprises:
coupling a first intermediate wire rope portion to the first connector;
coupling a second intermediate wire rope portion to the first connector; and
coupling the first wire rope to the intermediate wire ropes; and
wherein decoupling the first wire rope from the first connector comprises:
decoupling one of the intermediate wire ropes from the first connector, and then
decoupling the other intermediate wire rope from the first connector.

6. The method of claim 5, wherein decoupling one of the intermediate wire ropes from the first connector occurs after coupling the winch wire rope from the first winch on the subsea transfer equipment to the first connector.

7. The method of claim 6, further comprising coupling a second buoyancy module to the first wire rope after decoupling one of the intermediate wire ropes.

8. The method of claim 1, further comprising allowing a portion of the first wire rope disposed above the first buoyancy module to form a curved shape in the water.

9. The method of claim 1, wherein the buoyancy for the first connector is provided by a buoyancy module coupled to the flexible pipe and further comprising allowing a portion of the flexible pipe disposed above the buoyancy module coupled to the flexible pipe to form a curved shape in the water.

10. The method of claim 1, further comprising coupling one or more buoyant modules to the flexible pipe.

11. The method of claim 1, wherein the buoyancy for the first connector is provided by at least one buoyancy module coupled to the flexible pipe between its first and second ends, the method further comprising:
disposing the flexible pipe so that a portion of the flexible pipe above the at least one buoyancy module coupled to the flexible pipe forms a curved shape in the water; and
disposing the first wire rope so that a portion of the first wire rope above the first buoyancy module coupled to the first wire rope forms a curved shape in the water.

12. The method of claim 11, further comprising:
disposing the flexible pipe so that at least a portion of the flexible pipe forms an S-curve and disposing the first wire rope so that at least a portion of the first wire rope forms an S-curve.

13. The method of claim 11, further comprising:
disposing the flexible pipe so that at least a portion of the curved shape formed by the portion of the flexible pipe is an S-curve and so that at least a portion of the S-curve is disposed at a depth that is the same as or shallower than a depth of the first end of the flexible pipe in the water.

14. A method of installing a flexible pipe with a subsea connector into a connector on a subsea transfer equipment, comprising:
fluidicly coupling a vertically oriented riser from a floating structure to a pump;
fluidicly coupling the pump to the flexible pipe, the flexible pipe being fluidicly coupled with a first connector distal from the pump and being at least partially buoyant to provide buoyancy for the first connector in water;
coupling a first wire rope to the first connector;
coupling a first buoyancy module to the first wire rope;
coupling a weight to the first wire rope distal from the first connector;
lowering the first connector toward a seafloor, while allowing the weight to engage a supporting surface and the flexible pipe to bend while the riser maintains its vertical orientation;
lowering a subsea transfer equipment to the seafloor in proximity to the first connector;
coupling a wire rope from a first winch on the subsea transfer equipment to the first connector;
decoupling the first wire rope from the first connector prior to coupling the first connector to the connector on the subsea transfer equipment;
pulling the first connector toward the subsea miner with the wire rope from the first winch; and
fluidicly coupling the first connector to the connector on the subsea transfer equipment.

15. The method of claim 14, further comprising coupling one or more buoyant modules to the flexible pipe.

16. The method of claim 14, wherein coupling the first wire rope to the first connector comprises:
coupling a first intermediate wire rope portion to the first connector;
coupling a second intermediate wire rope portion to the first connector; and
coupling the first wire rope to the intermediate wire ropes; and
wherein decoupling the first wire rope from the first connector comprises:
decoupling one of the intermediate wire ropes from the first connector, and
decoupling the other intermediate wire rope from the first connector.

17. The method of claim 16, wherein decoupling one of the intermediate wire ropes from the first connector occurs after coupling the wire rope from the first winch on the subsea transfer equipment to the first connector.

18. The method of claim 17, further comprising coupling a second buoyancy module to the first wire rope after decoupling one of the intermediate wire ropes.

19. The method of claim 14, further comprising coupling a second buoyancy module to the first wire rope in proximity to the first connector.

20. The method of claim 19, wherein coupling the second buoyancy module to the first wire rope occurs after coupling the wire rope from the first winch on the subsea transfer equipment to the first connector.

21. The method of claim 14, further comprising allowing a portion of the first wire rope disposed above the first buoyancy module to form a curved shape in the water.

22. The method of claim 14, wherein the buoyancy for the first connector is provided by a buoyancy module coupled to the flexible pipe and further comprising allowing a portion of the flexible pipe disposed above the buoyancy module coupled to the flexible pipe to form a curved shape in the water.

23. The method of claim 14, further comprising coupling a wire rope from a second winch on the subsea transfer equipment to the first connector and pulling the first connector toward the subsea transfer equipment with the wire rope from the second winch concurrent to pulling the first connector toward the subsea transfer equipment with the wire rope from the first winch.

24. A method of installing a flexible pipe with a subsea connector into a connector on a subsea transfer equipment, comprising:
    fluidicly coupling a vertically oriented riser from a floating structure to a pump;
    fluidicly coupling the pump to the flexible pipe, the flexible pipe being fluidicly coupled with a first connector distal from the pump and being at least partially buoyant to provide buoyancy for the first connector in water;
    coupling a first wire rope to an intermediate member;
    coupling a first intermediate wire rope to the intermediate member;
    coupling a second intermediate wire rope to the intermediate member;
    coupling the first and second intermediate wire ropes to the first connector distal from the intermediate member;
    coupling a first buoyancy module to the first wire rope at a position below the intermediate member;
    coupling a weight to the first wire rope distal from the first connector;
    lowering the first connector toward a seafloor, while allowing the weight to engage a supporting surface and the flexible pipe to bend while the riser maintains its vertical orientation;
    lowering the subsea transfer equipment to the seafloor in proximity to the first connector;
    coupling a wire rope from a first winch on the subsea transfer equipment to the first connector;
    decoupling the first intermediate wire rope from the first connector;
    coupling a second buoyancy module to the intermediate member;
    decoupling the second intermediate wire rope from the first connector;
    pulling the first connector toward the subsea transfer equipment with the wire rope from the first winch; and
    fluidicly coupling the first connector to the connector on the subsea transfer equipment.

25. The method of claim 24, further comprising coupling a wire rope from a second winch on the subsea transfer equipment to the first connector and pulling the first connector toward the subsea transfer equipment with the wire rope from the second winch while pulling the first connector toward the subsea transfer equipment with the wire rope from the first winch.

26. The method of claim 24, wherein coupling the wire rope from the first winch on the subsea transfer equipment to the first connector occurs before coupling the second buoyancy module to the intermediate member.

27. The method of claim 24, wherein coupling the wire rope from the first winch on the subsea transfer equipment to the first connector occurs before decoupling one of the intermediate wire ropes, and occurs before coupling the second buoyancy module to the intermediate member.

28. The method of claim 24, further comprising allowing a portion of the first wire rope disposed above the first buoyancy module to form a curved shape in the water.

29. The method of claim 24, wherein the buoyancy for the first connector is provided by a buoyancy module coupled to the flexible pipe and further comprising allowing a portion of the flexible pipe disposed above the buoyancy module coupled to the flexible pipe to form a curved shape in the water.

30. A method of installing a flexible pipe with a subsea connector into a connector on a subsea transfer equipment, comprising:
    providing a first connector fluidicly coupled to a second end of the flexible pipe and a second connector fluidicly coupled to a first end of the flexible pipe, the flexible pipe being at least partially buoyant to provide buoyancy for the first connector in water;
    coupling a first wire rope to the first connector, the first wire rope having a first buoyancy module coupled thereto;
    coupling a weight to the first wire rope distal from the first connector;
    lowering the first connector toward a seafloor and disposing the first connector vertically in proximity to the subsea transfer equipment, while allowing the weight to engage a supporting surface and the flexible pipe to bend while the riser maintains its vertical orientation;
    coupling a first winch wire rope from a first winch on the subsea transfer equipment to the first connector;
    decoupling the first wire rope from the first connector prior to coupling the first connector to the connector on the subsea transfer equipment;
    pulling the first connector toward the subsea transfer equipment with the first winch wire rope from the first winch;
    fluidicly coupling the first connector to the connector on the subsea transfer equipment;
    coupling a second wire rope to the second connector, the second wire rope having a second buoyancy module coupled thereto;
    coupling a second weight to the second wire rope distal from the second connector;
    lowering the second connector toward the seafloor and disposing the second connector vertically in proximity to a second subsea transfer equipment, while allowing the weight to engage the seafloor;
    coupling a second winch wire rope from a second winch on the second subsea transfer equipment to the second connector;
    decoupling the second wire rope from the second connector;
    pulling the second connector toward the second subsea transfer equipment with the second winch wire rope from the second winch; and fluidicly coupling the second connector to a connector on the second subsea transfer equipment.

* * * * *

UNITED STATES PATENT AND TRADEMARK OFFICE
CERTIFICATE OF CORRECTION

PATENT NO.         : 8,657,531 B2
APPLICATION NO.    : 12/725133
DATED              : February 25, 2014
INVENTOR(S)        : Carlos M. Rios It is certified that error appears in the above-identified patent and that said Letters Patent is hereby corrected as shown below:

In the Claims:

Column 12, line 41 claim 30, the phrase "while the riser maintains its vertical orientation" should be deleted.

Signed and Sealed this
Fifth Day of August, 2014

Michelle K. Lee
*Deputy Director of the United States Patent and Trademark Office*